(12) United States Patent
Watarai et al.

(10) Patent No.: US 8,560,226 B2
(45) Date of Patent: *Oct. 15, 2013

(54) NAVIGATION DEVICE AND NAVIGATION METHOD

(75) Inventors: Norio Watarai, Tokyo (JP); Chiharu Hirai, Tokyo (JP)

(73) Assignee: Clarion Co. Ltd., Tokyo (JP)

( * ) Notice: Subject to any disclaimer, the term of this patent is extended or adjusted under 35 U.S.C. 154(b) by 299 days.

This patent is subject to a terminal disclaimer.

(21) Appl. No.: 12/626,015

(22) Filed: Nov. 25, 2009

(65) Prior Publication Data

US 2010/0138150 A1 Jun. 3, 2010

(30) Foreign Application Priority Data

Nov. 27, 2008 (JP) ................................ 2008-302854

(51) Int. Cl.
*G06F 17/00* (2006.01)
*G01C 21/26* (2006.01)
*G01C 21/36* (2006.01)
*G05D 1/00* (2006.01)

(52) U.S. Cl.
USPC ........... 701/425; 701/427; 701/438; 701/447; 340/995.14; 340/995.23

(58) Field of Classification Search
USPC ......... 701/400, 408, 409, 410, 425, 426, 427, 701/428, 430, 431, 437, 438, 443, 446, 447, 701/454, 457, 461, 466, 467, 487, 488, 532, 701/533, 538; 340/988, 995.1, 995.14, 340/995.16, 995.18, 995.19, 995.2, 995.23, 340/995.24, 995.27
See application file for complete search history.

(56) References Cited

U.S. PATENT DOCUMENTS

| 6,115,669 | A * | 9/2000 | Watanabe et al. ............. 701/428 |
| 6,333,702 | B1 * | 12/2001 | Hiyokawa et al. ....... 340/995.21 |
| 7,657,369 | B2 * | 2/2010 | Saito ............................ 701/437 |
| 2004/0260464 | A1 * | 12/2004 | Wong ............................ 701/209 |
| 2006/0224312 | A1 * | 10/2006 | Imanishi ....................... 701/209 |

(Continued)

FOREIGN PATENT DOCUMENTS

JP   10-282987 A   10/1998
JP   2000-205879   7/2000

(Continued)

OTHER PUBLICATIONS

Japanese Office Action dated Jan. 8, 2013 with English translation (7 pages).

(Continued)

*Primary Examiner* — Thomas Tarcza
*Assistant Examiner* — Edward Pipala
(74) *Attorney, Agent, or Firm* — Crowell & Moring LLP (57) ABSTRACT

Provided is a technology of a navigation device which is capable of identifying an intersection or the like based on designation of an incomplete name of a street in which an input of a first keyword and an input of a second keyword are received, and a connection point of a first street having a street name which includes at least in part the first keyword and a second street having a street name which includes at least in part the second keyword is identified, to thereby save the user, who is not always familiar with the geography of a search target area, from the inconvenience of inputting a complete name of the first street, based on which the second street is retrieved and selected and an intersection point of the first street and the second street is identified.

14 Claims, 8 Drawing Sheets

(56) References Cited

U.S. PATENT DOCUMENTS

| | | |
|---|---|---|
| 2008/0040032 A1 | 2/2008 | Ohashi |
| 2008/0077318 A1 | 3/2008 | Saito |
| 2008/0133123 A1 | 6/2008 | Katoh |

FOREIGN PATENT DOCUMENTS

| | | |
|---|---|---|
| JP | 2001-22375 A | 1/2001 |
| JP | 2003-005783 | 1/2003 |
| JP | 2005-004143 | 1/2005 |
| JP | 2007-279004 A | 10/2007 |
| JP | 2008-259314 | 4/2008 |
| JP | 2008-139252 | 6/2008 |

OTHER PUBLICATIONS

Japanese Office Action with English Translation dated May 14, 2013 (six (6) pages).

* cited by examiner

NAVIGATION DEVICE AND NAVIGATION METHOD

BACKGROUND OF THE INVENTION

The present invention relates to a technology for a navigation device.

Conventionally, there has been provided a technology for a navigation device in which an input of a name of a first street is received, and one of second streets retrieved based on the name thus received is selected and input, to thereby identify data (such as a branch point or a branch area) to be retrieved.

A technology for a navigation device as described above is disclosed in Japanese Patent Laid-open Publication No. 2008-76359.

However, in the navigation device described above, a complete name needs to be input as the name of a street. The street may not be identified when the name is incomplete.

In general, there are many cases where an operator of the navigation device is not familiar with the geography of the area to be searched, and therefore it is rare that the operator is capable of designating the complete name of the street. In other words, the operator may find the above-mentioned navigation device inconvenient.

SUMMARY OF THE INVENTION

It is an object of the present invention to provide a technology of a navigation device capable of identifying an intersection or the like based on designation of an incomplete name of a street.

In order to solve the above-mentioned problem, the present invention provides a navigation device including: storage unit adapted to store, for each, street, information for associating a name of the street, streets connecting to the street, and points of the connections; first input receiving unit adapted to receive an input of a first keyword forming a part of the name of the street; second input receiving unit adapted to receive an input of a second keyword forming another part of the name of the street; first identifying unit adapted to identify, as a first street, a street having a street name including the first keyword; second identifying unit adapted to identify, as a second street, a street having a street name including the second keyword; and connection point identifying unit adapted to identify a point at which the first street and the second street are connected to each other.

Further, the present invention provides a navigation method for a navigation device, the navigation device including storage unit adapted to store, for each street, information for associating a name of the street, streets connecting to the street, and points of the connections, the navigation method including: a first receiving step of receiving an input of a first keyword forming a part of the name of the street; a second receiving step of receiving an input of a second keyword forming another part of the name of the street; a step of identifying, as a first street, a street having a street name including the first keyword; a step of identifying, as a second street, a street having a street name including the second keyword; and a connection point identifying step of identifying a point at which the first street and the second street are connected to each other.

DESCRIPTION OF THE PREFERRED EMBODIMENT

In the following, a navigation device 100 to which an embodiment of the present invention is applied is described with reference to the accompanying drawings.

Figure 1:
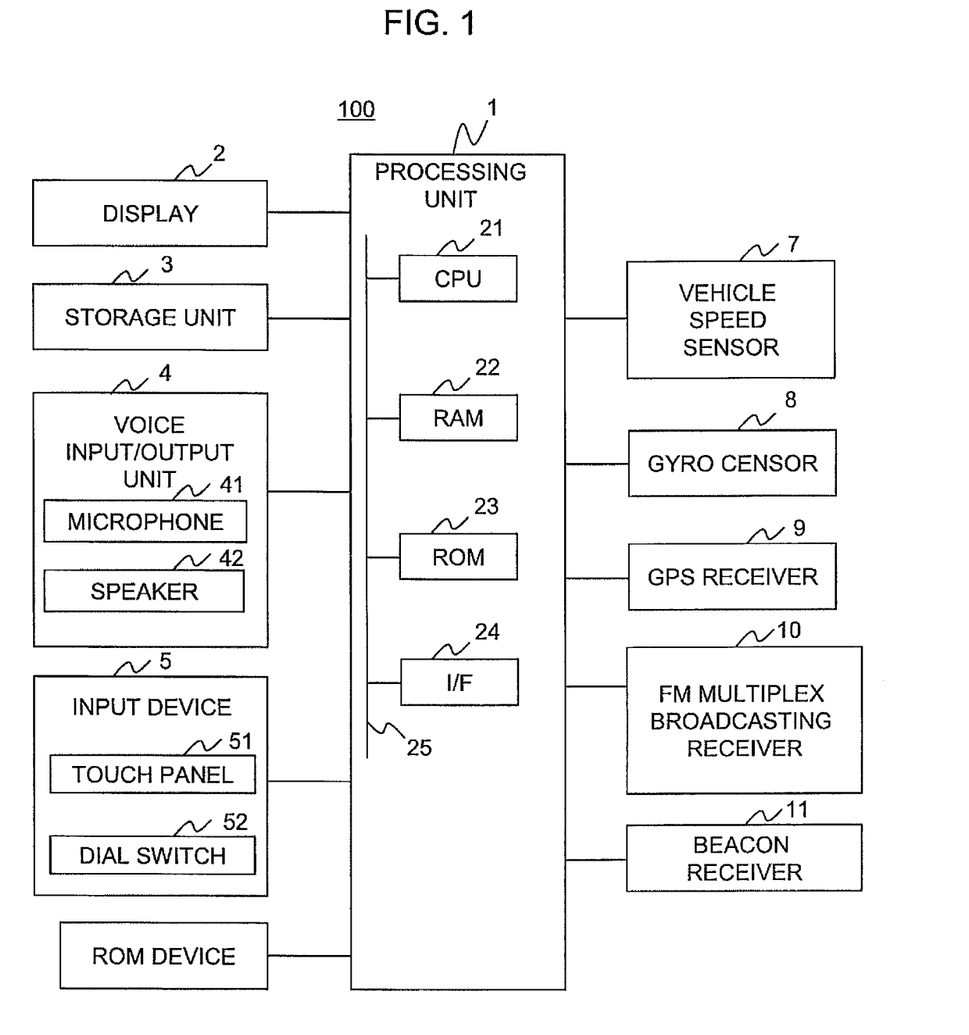
FIG. 1 is a schematic configuration diagram illustrating a navigation device to which an embodiment of the present invention is applied.

FIG. 1 is a schematic configuration diagram of a vehicle navigation device 100 to which the present invention is applied. As illustrated in FIG. 1, the vehicle navigation device 100 includes a processing unit 1, a display 2, a storage unit 3, a voice input/output unit 4 (including a microphone 41 as a voice input unit and a speaker 42 as a voice output unit), an input unit 5, a ROM device 6, a vehicle speed sensor 7, a gyro sensor 8, a global positioning system (GPS) receiver 9, an FM multiplex broadcasting receiver 10, and a beacon receiver 11.

The processing unit 1 is a central unit which performs various kinds of processing. For example, the processing unit 1 detects the present location based on information output by, for example, the various sensors 7 and 8, the GPS receiver 9, the FM multiplex broadcasting receiver 10, and the beacon receiver 11. Further, based on the obtained information on the present location, the processing unit 1 reads out map data necessary for display, from the storage unit 3 or the ROM device 6. Still further, the processing unit 1 graphically develops the map data thus read out, and displays the map data thus developed with a mark indicating the present location superposed thereon, on the display 2. Alternatively, the processing unit 1 makes a search for an optimal route (recommended route) which connects a departure place (present location) to a destination which are designated by the user, by using the map data or the like stored in the storage unit 3 or the ROM device 6. In addition, the processing unit 1 provides the user with guidance by using the speaker 42 and the display 2.

The processing unit 1 is implemented by connecting various devices through a bus 25. The processing unit 1 includes: a central processing unit (CPU) 21 which executes various kinds of processing such as performing mathematical operations and control on each of the devices; a random access memory (RAM) 22 which stores map data and operation data read out from the storage unit 3; a read only memory (ROM) 23 which stores programs and data, and an interface (I/F) 24 which connects various kinds of hardware to the processing unit 1.

The display 2 is a unit which displays graphic information created in the processing unit 1. The display 2 includes, for example, a liquid crystal display, or an organic electroluminescence (EL) display.

The storage unit 3 includes a storage medium such as a hard disk drive (HDD) or a nonvolatile memory card, which is capable of at least reading and writing.

The storage medium stores a link table 200 and a street information table 300, as map data (including link data on links constituting roads on the map) necessary for a general route search device.

Figure 2:
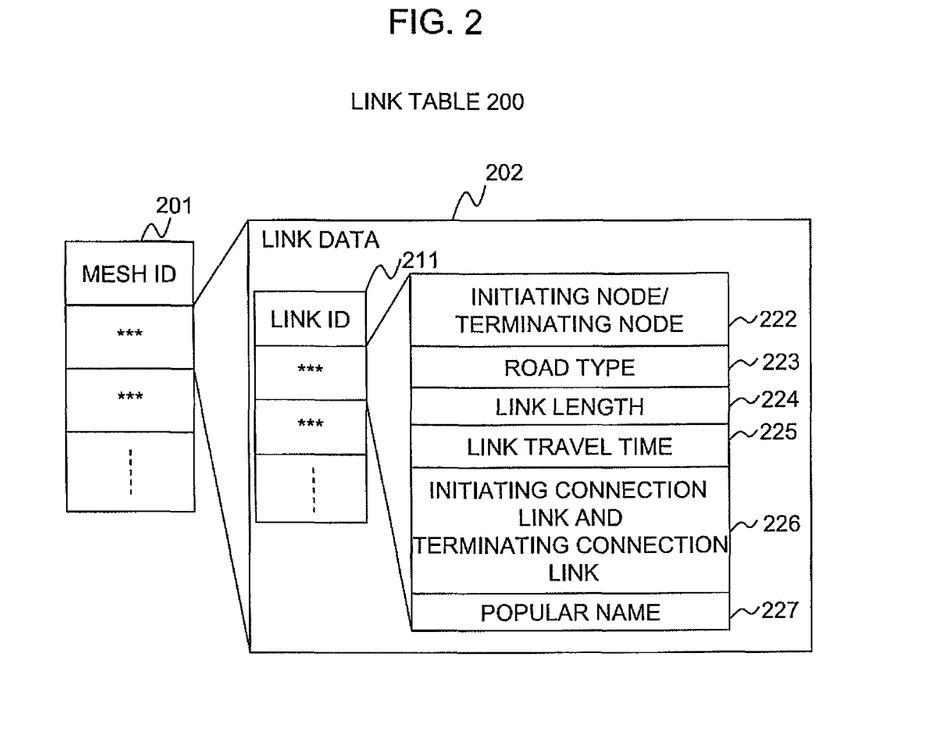
FIG. 2 illustrates a configuration example of a link table.

FIG. 2 illustrates a configuration example of the link table 200. The link table 200 contains, for each identification code (mesh ID) 201 for a mesh which is a partitioned area on a map, link data 202 on each of the links constituting roads included in the mesh area.

The link data 202 contains, for each link ID 211 which is an identifier of the link, coordinate information 222 on two nodes (initiating node and terminating node) which form the link, a road type 223 indicating a type of the road which includes the link, a link length 224 and a link travel time 225 which indicate a distance of the link, an initiating connection link and terminating connection link 226 which contain link IDs (connection link IDs) of links connecting to the two nodes forming the link, and a popular name 227 indicating a popular name (such as "MAIN") of the road which includes the link.

It should be noted that, in this example, the two nodes forming the link are differentiated from each other as the initiating node and the terminating node, and hence the upbound direction and the downbound direction of the same road are separately managed as different links. The link travel time 225 may include link travel times which are associated with conditions such as date and weather.

Figure 3:
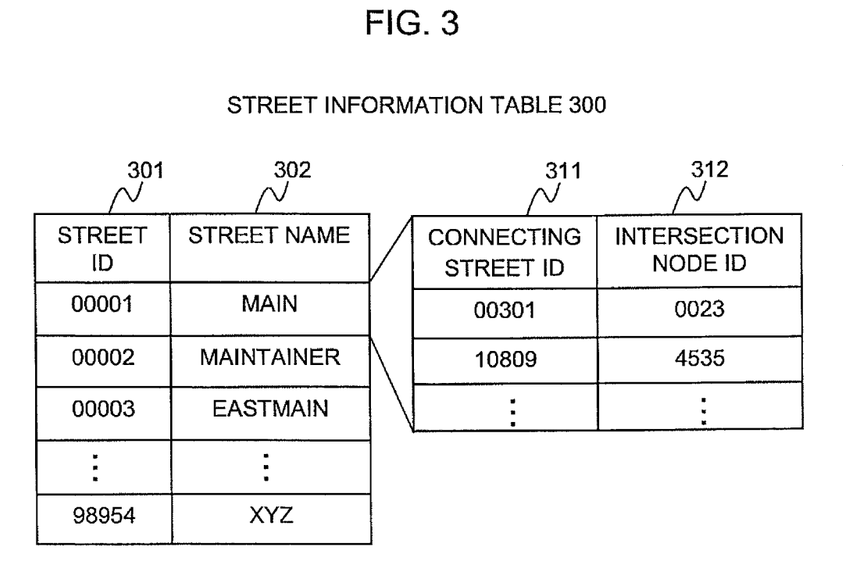
FIG. 3 illustrates a configuration example of a street information table.

FIG. 3 illustrates a configuration example of the street information table 300. The street information table 300 stores, for each street indicating a road, a connecting street which connects to the street and a connection point (such as intersection or roundabout) at which the street connects to the connecting street, such that the connecting street and the connection point are associated with each other.

The street information table 300 stores a street ID 301 which identifies the street and a street name 302 which includes the name of the street, such that the street ID 301 and the street name 302 are associated with each other. The street information table 300 contains, for each street ID 301, a connecting street ID 311 which identifies a connecting street, and an intersection node ID 312 which identifies a connection point at which the street connects to the connecting street.

Specifically, the street ID 301 includes information for identifying the street, such as "00001" and "00002".

The street name 302 includes information related to a name of the street identified by the street ID 301. For example, names such as "MAIN" and "EASTMAIN" are included.

It should be noted that the street name 302 is stored as being associated with the street ID 301. When the street has another name, the street ID 301 may be associated with a plurality of street names.

The connecting street ID 311 includes information for identifying a connecting street which connects to the street identified by the street ID 301 (The connection includes intersection at an intersection or connection at a roundabout).

In a case where a plurality of connecting streets connect to one street, the connecting street IDs 311 to be associated with the plurality of connecting streets are provided as many, as the number of the plurality of streets.

The intersection node ID 312 includes information for identifying a point (node) at which a street identified by the street ID 301 and a street identified by the connecting street ID 311 connect to each other.

Referring again to FIG. 1, the navigation device 100 is further described. The voice input/output unit 4 includes the microphone 41 as a voice input unit and the speaker 42 as a voice output unit. The microphone 41 picks up a sound produced outside the vehicle navigation device 100, such as a voice uttered by the user or another passenger.

The speaker 42 outputs a message to the user, which is created in the processing unit 1, as a voice signal. The microphone 41 and the speaker 42 are separately disposed at predetermined positions in a vehicle, or may be integrally accommodated in a casing. The vehicle navigation device 100 may include a plurality of the microphones 41 and a plurality of the speakers 42.

The input unit 5 receives an instruction from the user, through operations performed by the user. The input unit 5 includes a touch panel 51, a dial switch 52, a scroll key, a scale adjusting key as other hard switches (not shown), and the like.

The touch panel 51 is mounted on a display surface side of the display 2, allowing the display screen to be seen therethrough. The touch panel 51 identifies a touch position which is associated with the X and Y coordinates of an image displayed on the display 2, and outputs the touch position converted into a form of the coordinates. The touch panel 51 includes a pressure-sensitive or electrostatic input detecting element or the like.

The dial switch 52 is configured to be rotatable in a clockwise direction or in a counter-clockwise direction, generates a pulse signal for each predetermined angle of rotation, and outputs the pulse signal to the processing unit 1. The processing unit 1 obtains the rotational angle based on the number of the pulse signals.

The ROM device 6 includes a storage medium such as a read only memory (ROM) including CD-ROM and DVD, or an integrated circuit (IC) card, which is at least readable. The storage medium stores, for example, moving image data and voice data.

The vehicle speed sensor 7, the gyro sensor 8, and the GPS receiver 9 are used for detecting a present location (own vehicle position) by the vehicle navigation device 100.

The vehicle speed sensor 7 outputs a value to be used for calculating a vehicle speed. The gyro sensor 8 includes an optical-fiber gyroscope or a vibrating gyroscope, and detects an angular speed according to the rotation of a moving object. The GPS receiver 9 receives a signal from a GPS satellite and measures, with respect to at least three GPS satellites, a distance between a moving object and each of the GPS satellites and a rate of change in the distance, to thereby obtain a present location, a traveling speed, and a traveling direction of the moving object, which are transmitted to the processing unit 1.

The FM multiplex broadcasting receiver 10 receives an FM multiplex broadcasting signal transmitted from an FM multiplex broadcasting station. The FM multiplex broadcasting includes general current traffic information, regulation information, service area/parking area (SA/PA) information, parking information, weather information, which are provided as vehicle information communication system (VICS: registered trademark) information, and text information provided as FM multiplex general information by a radio station.

The beacon receiver 11 receives a signal such as an optical beacon or a radio wave beacon. The signal such as a beacon includes general current traffic information, regulation information, service area/parking area (SA/PA) information, and parking information, which are provided as VICS information.

Figure 4:
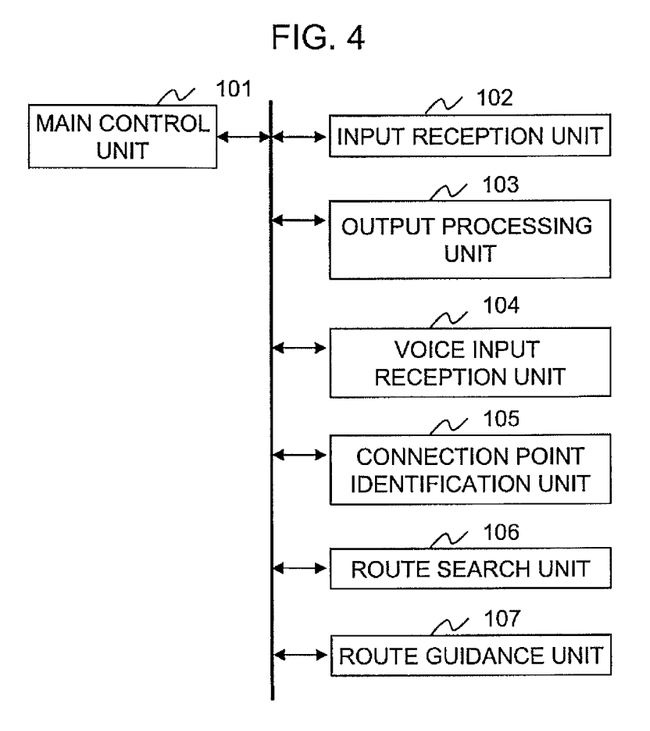
FIG. 4 illustrates a functional configuration of a processing unit.

FIG. 4 is a functional block diagram of the processing unit 1.

As illustrated in FIG. 4, the processing unit 1 includes a main control unit 101, an input reception unit 102, an output processing unit 103, a voice input reception unit 104, a connection point identification unit 105, a route search unit 106, and a route guidance unit 107.

The main control unit 101 is a central functional unit which performs various kinds of processing, and controls other processing units depending on the type of the processing. Further, the main control unit 101 performs navigation processing (for example, display of traffic information, or display of a present location) which is a basic operation of the vehicle navigation device 100.

The input reception unit 102 is a processing unit which receives an instruction input by, the user through the touch panel 51 and the dial switch 52, and passes the instruction to each of the processing units.

The output processing unit 103 is a functional unit which causes the display 2 to perform a screen output. The output processing unit 103 receives screen data and display candidates which are required to be displayed on the display 2, and creates a screen drawing command so that a road and other elements constituting the map, a present location, a destination, a recommended route, and a dialogue for message information are rendered by a designated drawing method. Then, the created command is transmitted to the display 2.

The voice input reception unit 104 is a processing unit which receives an instruction input by the user through the microphone 41, and passes the instruction to each of the processing units.

The connection point identification unit 105 receives input information designating a first street, and receives input information designating a second street, to thereby identify an intersection node at which the first street and the second street connect to each other.

The route search unit 106 retrieves a route minimal in cost (for example, in terms of distance or travel time) which connects designated two points (present location and destination or stop-off point), by using Dijkstra's algorithm or the like. It should be noted that the route is defined by sequentially connecting in series a plurality of nodes which are points provided at positions indicating a road and links connecting two nodes. Further, the route search unit 106 combines costs given in advance with respect to each node and each link included in the route, to thereby determine the cost for the entire route. Then, the route search unit 106 calculates a time that it takes to reach the destination or the stop-off point through the route, and stores route information for specifying the route, in a predetermined area of the RAM 22 or the storage unit 3.

The route guidance unit 107 identifies the route based on the route information corresponding to the route obtained as a result of the search performed by the route search unit 106, and provides the user with guidance on the travel route.

For example, the route guidance unit 107 compares the route information and information on the present location, and informs the user whether or not to go straight or to turn left or right before passing through an intersection or the like, by voice with the use of the speaker 42.

Still further, the route guidance unit 107 displays a traveling direction on a map displayed on the display 2, to thereby inform the user of a recommended route.

It should be noted that the CPU 21 executes programs loaded in the RAM 22 or the ROM 23, to thereby implement the main control unit 101, the input reception unit 102, the output processing unit 103, the voice input reception unit 104, the connection point identification unit 105, the route search unit 106, and the route guidance unit 107.

[Description of Operations] Next, an operation of the vehicle navigation device 100 with the above-mentioned configuration is described.

Figure 5:
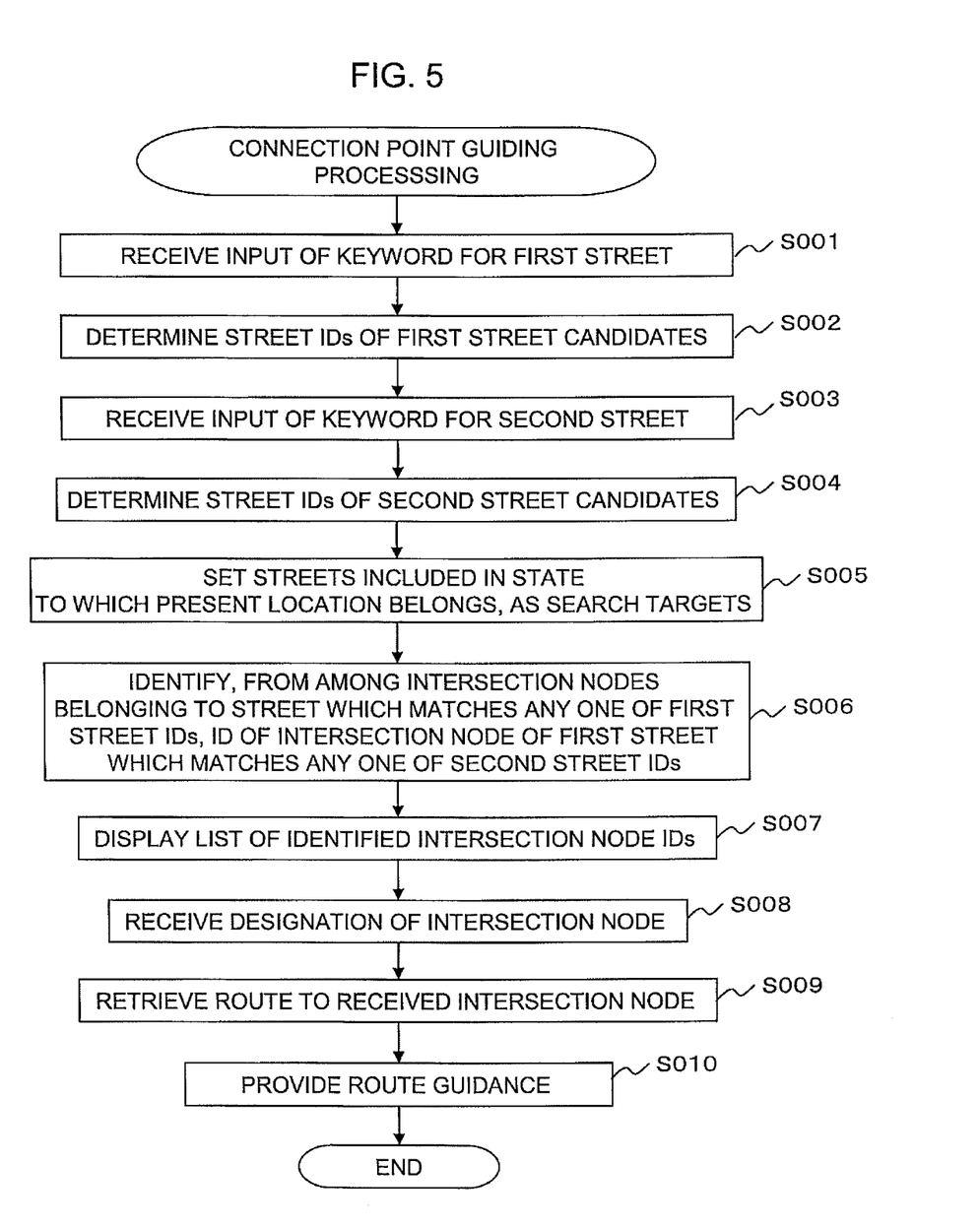
FIG. 5 is a flow chart of a connection point guiding processing.

FIG. 5 is a flow chart for illustrating a flow of connection point guiding processing.

The main control unit 101 receives an instruction from the user of the navigation device 100, and starts the flow of the processing.

The input reception unit 102 receives an input of a keyword for specifying the first street (Step S001).

Specifically, the input reception unit 102 receives designation of a keyword included in the name of the street. At this time, the input reception unit 102 receives a keyword corresponding to a part or all of the name of the street. There is no need for the user to designate the correct name of the street.

When receiving the keyword designation, the input reception unit 102 receives the input in units of written characters such as alphabets.

In order to receive an input by voice, the voice input reception unit 104 receives designation of, a keyword included in the name of the street. In this case, the voice input reception unit 104 receives a voice for specifying the keyword as an utterance expression of a word or the like. However, the present invention is not limited thereto, and the voice input reception unit 104 may receive a voice expressing a word consisting of a group of alphabets pronounced one by one.

Next, the connection point identification unit 105 identifies candidate streets for the first street, and determines the street IDs of the candidate streets (Step S002).

Specifically, the connection point identification unit 105 identifies, in the street information table 300, a street including the keyword received in Step S001 as the street name 302, and reads out the street ID 301 of the street.

At this time, in a case where there are a plurality of streets which include the keyword, the connection point identification unit 105 identifies, in the street information table 300, all the streets including the keyword, and reads out all the street IDs 301 of the streets thus identified.

Next, the input reception unit 102 receives an input of a keyword for specifying the second street (Step S003).

Specifically, the input reception unit 102 receives designation of a keyword included in the name of the street. At this time, the input reception unit 102 receives a keyword corresponding to a part or all of the name of the street. There is no need for the user to designate the correct name of the street.

When receiving the keyword designation, the input reception unit 102 receives the input in units of written characters such as alphabets.

In order to receive an input by voice, the voice input reception unit 104 receives designation of a keyword included in the name of the street. In this case, the voice input reception, unit 104 receives a voice for specifying the keyword as an utterance expression of a word or the like. However, the present invention is not limited thereto, and the voice input reception unit 104 may receive a voice expressing a word consisting of a group of alphabets pronounced one by one.

Next, the connection point identification unit 105 identifies candidate streets for the second street, and determines the street IDs of the candidate streets (Step S004).

Specifically, the connection point identification unit 105 identifies, in the street information table 300, a street including the keyword received in Step S003 as the street name 302, and reads out the street ID 301 of the street.

At this time, in a case where there are a plurality of streets which include the keyword, the connection point identification unit 105 identifies, in the street information table 300, all the streets including the keyword, and reads out all the street IDs 301 of the streets thus identified.

Next, the connection point identification unit 105 identifies a present location of a vehicle on which the navigation device 100 is mounted, and sets streets included in a state to, which the present location belongs, as search targets (S005).

Specifically, the connection point identification unit 105 requests coordinates specifying the present location, from the main control unit 101, and identifies an administrative area (for example, state) which includes a position specified by the coordinates.

Then, the connection point identification unit 105 identifies a street which is included in part in the identified administrative area, and extracts, as a search target, the corresponding street from the street information table 300.

It should be noted that the search targets may not be limited to streets included in the administrative area, and streets in the vicinity of the present location may be included as eh search targets. Specifically, the search targets may include a street which is included in part within a predetermined distance from the present location. Alternatively, the search targets may include a street which includes in part a link directly connecting to a node in a mesh to which the present location belongs.

Next, from among intersection nodes belonging to a street which matches any one of the first street IDs determined in Step S002, the connection point identification unit 105 identifies an ID of an intersection node indicating a connection point at which the first street connects to a street which matches any one of the second street IDs (Step S006).

Specifically, the connection point identification unit 105 identifies, from among, the search targets set in Step S005, records which includes the street ID 301 matching any one of the first street IDs determined in Step S002. Then, the connection point identification unit 105 further identifies, from among the identified records, a record which includes the connecting street ID 311 matching any one of the second street IDs determined in Step S004, and identifies the intersection node ID 312 of the record.

Next, the output processing unit 103 displays on the display 2 the list of the intersection node IDs 312 identified in Step S006 (Step S007).

Specifically, the output processing unit 103 displays first street names in association with second street names, the first street names and the second street names constituting the intersection node IDs 312 identified in Step S006, to thereby display the list of information for specifying the intersection node IDs 312.

Next, the input reception unit 102 receives designation of one intersection node ID, from among the list of the intersection node IDs 312 displayed in Step S007 (Step S008).

Specifically, the input reception unit 102 receives an input of designation for identifying a combination of the first street name and the second street name in the list of information displayed in Step S007.

Next, the route search unit 106 retrieves a route from the present location of the vehicle on which the navigation device 100 is mounted to the intersection node for which an input of designation is received in Step S008 (Step S009).

Next, the route guidance unit 107 starts providing guidance on the route retrieved in Step S009 (Step S010).

Hereinabove, the flow of the connection point guiding processing has been described.

Next, an example of a screen display displayed in the connection point guiding processing is described with reference to FIGS. 6A to 6C.

Figure 6A:
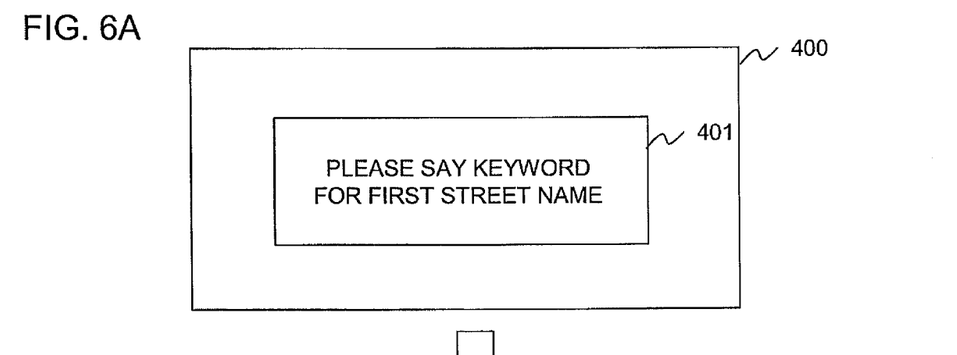
FIGS. 6A to 6C each illustrate a screen example employed in the connection point guiding processing.

FIG. 6A illustrates an example of a screen display displayed in Step S001 of the connection point guiding processing (in a case of voice input).

FIG. 6A illustrates a screen 400 and a message display area 401 displayed within the screen 400. The message display area 401 displays a message requesting an input of a keyword for specifying a first street name, such as "PLEASE SAY A KEYWORD FOR THE FIRST STREET NAME.".

After the processing in Step S002 is completed, the screen 400 makes a transition to a screen 410 coming next.

Figure 6B:
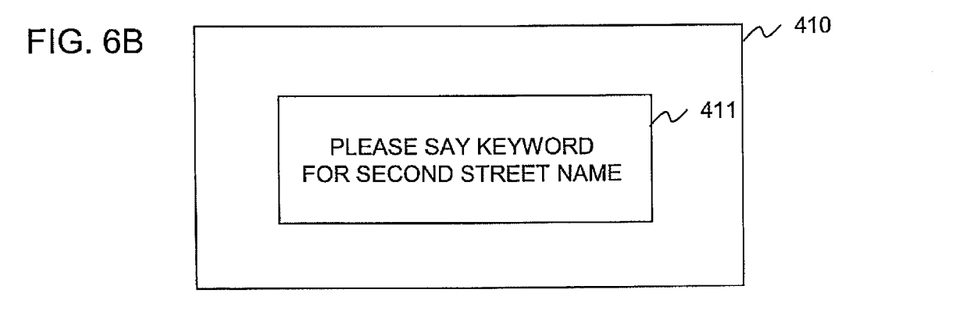

FIG. 6B illustrates an example of a screen display displayed in Step S003 of the connection point guiding processing (in the case of voice input).

FIG. 6B illustrates the screen 410 and a message display area 411 displayed within the screen 410. The message display area 411 displays a message requesting an input of a keyword for specifying a second street name, such as "PLEASE SAY A KEYWORD FOR THE SECOND STREET NAME.".

After the processing in Step S006 is completed, the screen 410 makes a transition to a screen 420 coming next.

Figure 6C:
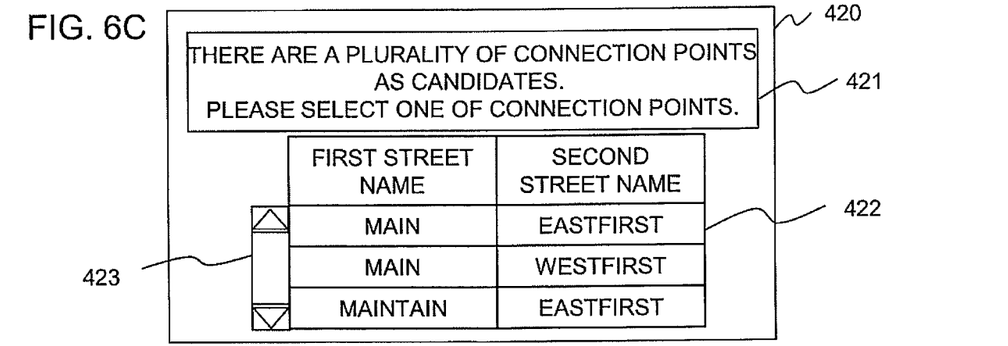

FIG. 6C illustrates an example of a screen display displayed in Step S007 of the connection point guiding processing.

FIG. 6C illustrates the screen 420, a message display area 421 displayed within the screen 420, and a connection point list display area 422.

The message display area 421 displays a message requesting an input for selecting an intersection node, such as "THERE ARE A PLURALITY OF CONNECTION POINTS AS CANDIDATES. PLEASE SELECT ONE OF THE CONNECTION POINTS.".

The connection point list display area 422 displays a list of combinations of the first street names and the second street names, which is information for identifying the connection points.

After the processing in Step S008 is completed, the screen 420 makes a transition to a screen for providing route guidance.

Next, a specific example of the connection point guiding processing is described with reference to FIGS. 7A and 7B.

Figure 7A:
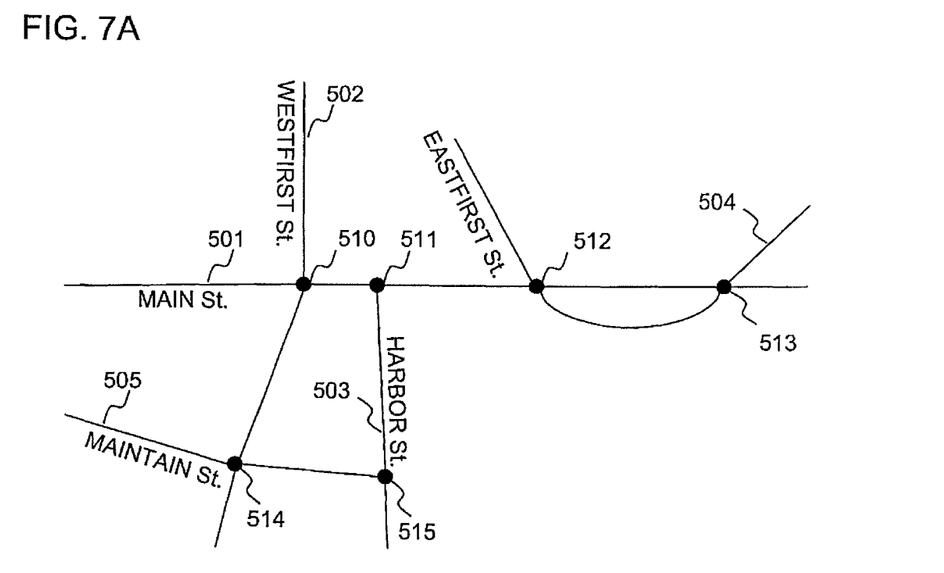
FIGS. 7A and 7B each illustrate a specific example of processing performed in the connection point guiding processing.
Figure 7B:
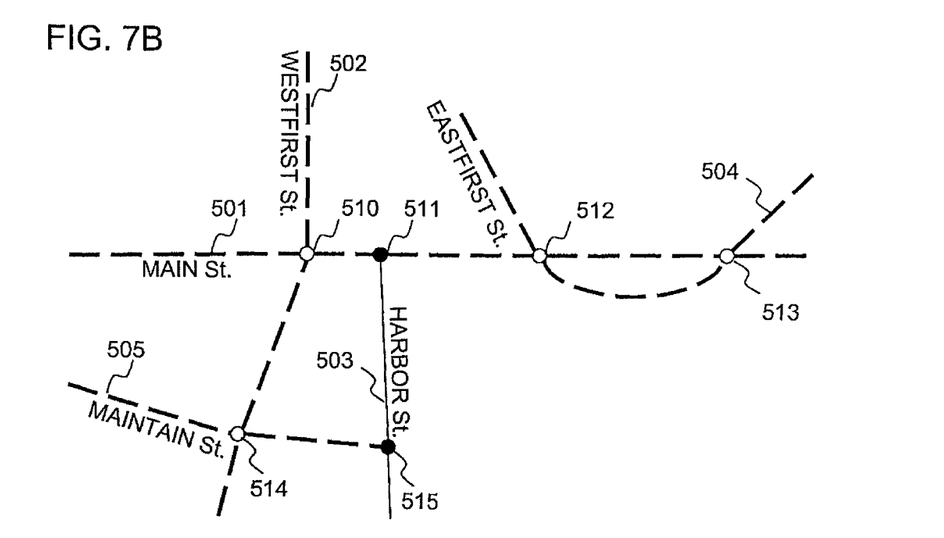

FIG. 7A schematically illustrates an example of roads included in an area to be subjected to the connection point guiding processing. FIG. 7A illustrates a positional relation among a connection point 510 at which a "MAIN" street 501 connects to a "WESTFIRST" street 502, a connection point 511 at which the "MAIN" street 501 connects to a "HARBOR" street 503, a connection point 512 on the west side and a connection point 513 on the east side at each of which the "MAIN" street 501 connects to an "EASTFIRST" street 504, a connection point 514 at which a "MAINTAIN" street 505 connects to the "WESTFIRST" street 502, and a connection point 515 at which the "MAINTAIN" street 505 connects to the "HARBOR" street 503.

In this example, when a keyword is designated as "MAIN" in Step S001 of the connection point guiding processing, streets with a name including a keyword "MAIN", namely, the "MAIN" street 501 and the "MAINTAIN" street 505, are determined as candidate streets in Step S002.

Further, when a keyword is designated as "FIRST" in Step S003, streets with a name including a keyword "FIRST", namely, the "WESTFIRST" street 502 and the "EAST-FIRST" street 504, are determined as candidate streets in Step S004.

In this case, in Step S006, the connection point identification unit 105 identifies, as the intersection nodes, the connection point 510 of the "MAIN" street 501 and the "WESTFIRST" street 502, the connection point 512 on the west side and the connection point 513 on the east side of the "MAIN" street 501 and the "EASTFIRST" street 504, and the connection point 514 of the "MAINTAIN" street 505 and the "WESTFIRST" street 502.

Then, in Step S007, the output processing unit 103 displays a list of records which includes the connection point 510 of the "MAIN" street 501 and the "WESTFIRST" street 502 as a first record, the connection point 512 on the west side of the "MAIN" street 501 and the "EASTFIRST" street 504 as a second record, the connection point 513 on the east side of the "MAIN" street 501 and the "EASTFIRST" street 504 as a third record, and the connection point 514 of the "MAINTAIN" street 505 and the "WESTFIRST" street 502 as a fourth record.

Hereinabove, the embodiment of the present invention has been described.

According to the above-mentioned embodiment of the present invention, the vehicle navigation device 100 is capable of identifying streets based on keywords for names of the streets, and identifying an intersection or the like at which the two streets thus identified connect to each other, to thereby provide route guidance. The above-mentioned embodiment may be implemented as an effective destination identification method of setting a destination based only on a keyword, even in unfamiliar places, for example, in an area where an address is identified mainly based on a street name.

The present invention is not limited to the above-mentioned embodiment. The above-mentioned embodiment may be subjected to various modifications within the scope of the technical idea of the present invention.

For example, in the above-mentioned embodiment, the flow of the connection point guiding processing proceeds from Step S001 to Step S010 in sequence as described above. However, the present invention is not limited thereto.

That is, an input of a keyword for the first street is received and an input of a keyword for the second street is received, and then a street ID for the first street candidate may be determined and a street ID for the second street candidate may be determined.

Alternatively, the search targets may be set prior to Step S001 and then Step S001 may be performed, rather than setting the search targets in Step S005.

Further, in the above-mentioned embodiment, in the connection point guiding processing, the intersection nodes are identified in Step S006 and then the list of all the identified intersection nodes is displayed in Step S007. However, the present invention is not limited thereto.

That is, in a case where the number of intersection nodes identified in Step S006 exceeds a predetermined number (for example, fifty), the number may be reduced through search refinement by additionally providing a search keyword or by narrowing down a search target area (for example, to a city).

Figure 8:
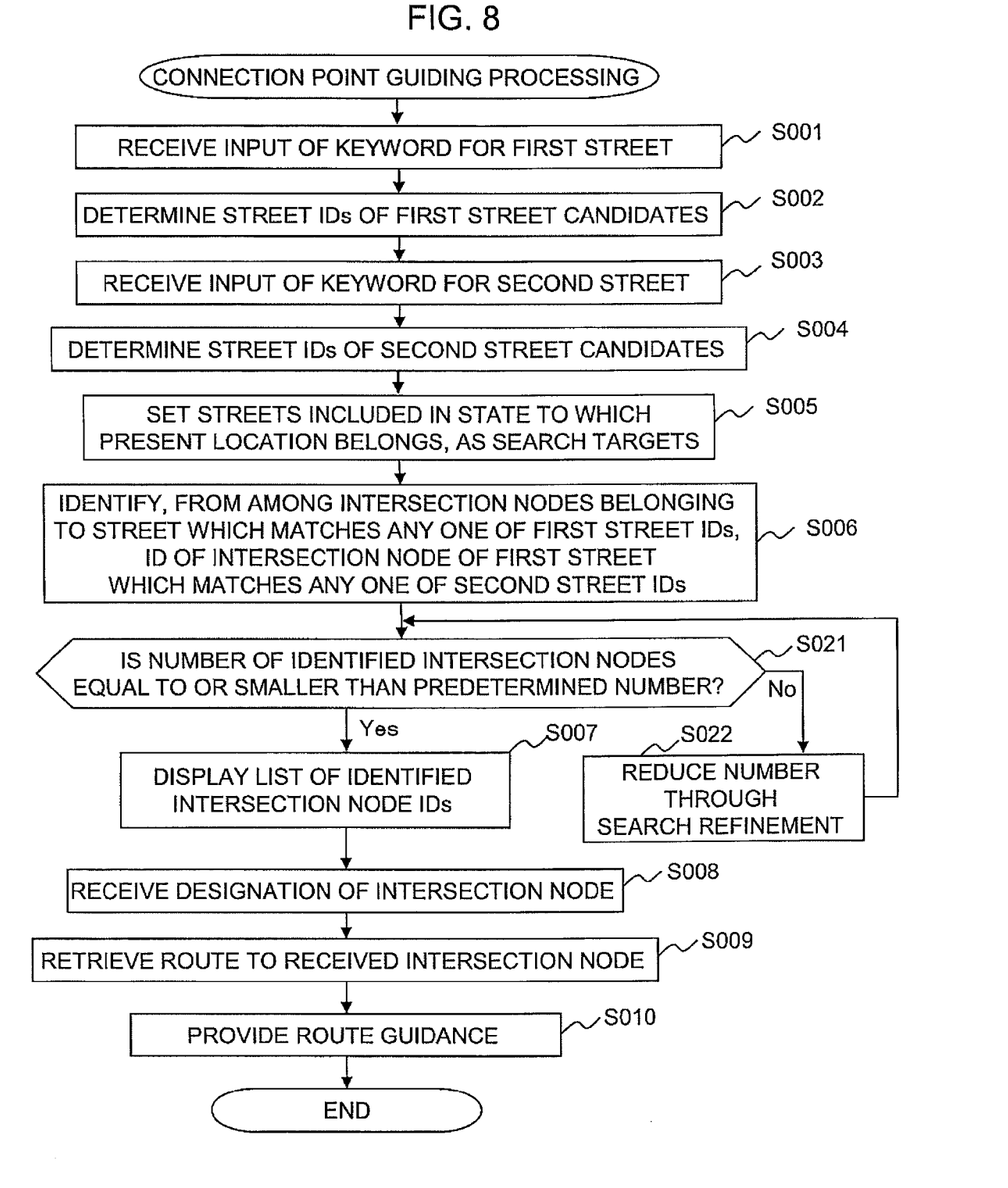
FIG. 8 illustrates a modified flow of the connection point guiding processing.

Specifically, processing illustrated in FIG. 8 may be performed.

FIG. 8 illustrates a modified flow of the connection point guiding processing.

As illustrated in FIG. 8, between Step S006 and Step S007, the connection point identification unit 105 judges whether the number of identified intersection nodes is equal to or smaller than a predetermined number (Step S021). In a case where the number of intersection nodes is not equal to or smaller than the predetermined number (in a case of "No" in Step S021), the number of intersection nodes is reduced through the search refinement as described above, and the control is returned to Step S021 (Step S022). When the number of intersection nodes is equal to or smaller than the predetermined number (in a case of "Yes" in Step S021), the control is passed to Step S007.

The connection point guiding processing may be modified as described above. When the processing is modified as described above, in the navigation device 100, there may be avoided a case where so many intersection nodes are displayed that the user is unable to make designation.

Further, in the connection point guiding processing, when displaying the list of intersection node IDs 312 identified in Step S006 on the display 2 in Step S007, names of the intersection indicating the intersection nodes may also be displayed.

With this configuration, the user may receive more information for recognizing the intersection nodes, and hence the designation of the intersection node may be made with ease.

In the above-mentioned embodiment, the description is given of the example in which the present invention is applied to the vehicle navigation device. However, the present invention may also be applied to a navigation device used for any other purpose than vehicle.

What is claimed is:

1. A navigation device, comprising:
a storage unit adapted to store street name information and connection point information among streets;
a street identifying unit adapted to receive an input of a first keyword and an input of a second keyword and identifies, based on the street name information, a first street having a street name which includes at least in part the first keyword and a second street having a street name which includes at least in part the second keyword;
a connection point identifying unit adapted to identify, based on the connection point information, at least one connection point of the first street and the second street;
a search refinement condition receiving unit adapted to receive a third keyword as a condition for performing search refinement, in a case where a number of connection points identified by the connection point identifying unit is larger than a predetermined number;
a connection point search refining unit adapted to reduce the number of connection points identified by the connection point identifying unit to a number of connection points included in the third keyword; and
a connection point designation receiving unit adapted to receive one connection point designation of the connection points;
wherein the second keyword is input prior to identifying the second street.

2. A navigation device according to claim 1, further comprising a connection point designation receiving unit adapted to receive designation of a connection point, in a case where a plurality of connection points are identified by the connection point identifying unit.

3. A navigation device according to claim 1, comprising:
a present location identifying unit,
a route search unit adapted to retrieve a route connecting a present location identified by the present location identifying unit to the connection point of the first street and the second street; and
a route guidance unit adapted to provide guidance on the route retrieved.

4. A navigation device according to claim 3, wherein the street identifying unit receives the input of the first keyword and the input of the second keyword by voice.

5. A navigation device according to claim 3, further comprising:
a search refinement condition receiving unit adapted to receive information specifying a condition for performing search refinement, in a case where a number of the connection points of the first streets and the second streets is equal to or larger than a predetermined number; and
a connection point search refining unit adapted to reduce the number of the connection points by narrowing down the connection points to connection points belonging to a range matching the condition specified by the information received by the search refinement condition receiving unit.

6. A navigation device according to claim 5, wherein the street identifying unit receives the input of the first keyword and the input of the second keyword by voice.

7. A navigation device according to claim 1, wherein the street identifying unit receives the input of the first keyword and the input of the second keyword by voice.

8. A navigation method for a navigation device,
wherein the navigation device comprising the storage unit adapted to store street name information and connection point information among streets, and
the navigation method comprising:
a street identifying step of receiving an input of a first keyword and an input of a second keyword and identifying, based on the street name information, a first street having a street name which includes at least in part the first keyword and a second street having a street name which includes at least in part the second keyword;
a connection point identifying step of identifying, based on the connection point information, at least one connection point of the first street and the second street;
a search refinement condition step of receiving a third keyword as a condition for performing search refinement, in a case where a number of connection points identified by the connection point identifying step is larger than a predetermined number;
a connection point search refining step of reducing the number of connection points identified by the connection point identifying step to a number of connection points included in the third keyword; and
a connection point designation step of receiving one connection point designation of the connection points;
wherein the second keyword is input prior to identifying the second street.

9. A navigation method according to claim 8, further comprising a connection point designation receiving step of receiving designation of a connection point, in a case where a plurality of connection points are identified by the connection point identifying step.

10. A navigation method according to claim 8, wherein the street identifying step of receiving the input of the first keyword and the input of the second keyword by voice.

11. A navigation method according to claim 8, further executing:
a present location identifying step,
a route searching step of retrieving a route connecting a present location identified by the present location identifying step to the connection point of the first street and the second street; and
a route guiding step of providing guidance on the route retrieved.

12. A navigation method according to claim 11, wherein the street identifying step of receiving the input of the first keyword and the input of the second keyword by voice 13. A navigation method according to claim 11, executing:
a search refinement condition receiving step of receiving information specifying a condition for performing search refinement, in a case where a number of the connection points identified in the connection point identifying step is equal to or larger than a predetermined number; and
a connection point search refining step of reducing the number of the connection points by narrowing down the connection points to connection points belonging to a range matching the condition specified by the information received in the search refinement condition receiving step.

14. A navigation method according to claim 13, wherein the street identifying step of receiving the input of the first keyword and the input of the second keyword by voice.

* * * * *